(12) United States Patent  
Muro

(10) Patent No.: US 9,071,007 B2
(45) Date of Patent: Jun. 30, 2015

(54) CONNECTOR WITH GROMMET

(71) Applicant: Yazaki Corporation, Tokyo (JP)

(72) Inventor: Takashi Muro, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 14/087,306

(22) Filed: Nov. 22, 2013

(65) Prior Publication Data
US 2014/0079473 A1 Mar. 20, 2014

Related U.S. Application Data

(63) Continuation of application No. PCT/JP2012/066632, filed on Jun. 22, 2012.

(30) Foreign Application Priority Data

Jun. 24, 2011 (JP) ................................. 2011-140767

(51) Int. Cl.
H01R 13/74 (2006.01)
H01R 33/00 (2006.01)
H01R 13/52 (2006.01)

(52) U.S. Cl.
CPC ........ *H01R 13/5219* (2013.01); *H01R 13/5202* (2013.01); *H01R 13/743* (2013.01)

(58) Field of Classification Search
CPC ..... H01R 13/74; H01R 33/00; H01R 13/5202
See application file for complete search history.

(56) References Cited

U.S. PATENT DOCUMENTS

| 5,249,982 | A * | 10/1993 | Funck et al. ................ 439/556 |
| 5,618,204 | A * | 4/1997 | Nix et al. .................... 439/559 |
| 6,113,424 | A * | 9/2000 | Shinozaki ................... 439/559 |
| 6,508,666 | B1 * | 1/2003 | Francis ....................... 439/548 |
| 7,828,591 | B2 | 11/2010 | Matsuoka |
| 2009/0124121 | A1 * | 5/2009 | Matsuoka .................... 439/550 |
| 2010/0003850 | A1 * | 1/2010 | Bartholoma et al. ....... 439/550 |
| 2010/0267264 | A1 | 10/2010 | Sawairi et al. |
| 2011/0182551 | A1 * | 7/2011 | Aiudi et al. .................. 385/53 |

FOREIGN PATENT DOCUMENTS

| CN | 101867118 A | 10/2010 |
| JP | H06-223928 A | 8/1994 |
| JP | 2010-102872 A | 5/2010 |

OTHER PUBLICATIONS

International Search Report and Written Opinion mailed Sep. 12, 2012.

(Continued)

Primary Examiner — Gary Paumen
(74) Attorney, Agent, or Firm — Morgan, Lewis & Bockius LLP

(57) ABSTRACT

A connector is configured so that a fitting part of a connector housing and a panel is sealed by bringing a lip part of a flange attachment part of a waterproof grommet for surrounding an outer periphery of a flange into pressing contact with the peripheral edge of an attachment hole when the peripheral edge of the attachment hole is held between a locking protrusion of a housing body and the flange provided at a rear end of the housing body. In the connector, the flange includes a plurality of flexible pieces which elastically displaces the lip part to the side of the locking protrusion so as to expand a proper plate thickness range of the panel capable of making close contact with the lip part.

3 Claims, 14 Drawing Sheets

(56) References Cited

OTHER PUBLICATIONS

Office Action dated Mar. 13, 2015 in corresponding related Korean application No. 10-2013-7033845 along with English translation of same.

Office Action dated Jan. 20, 2015 for corresponding Japanese patent application No. 2011-140767.

Office Action dated May 6, 2015 in corresponding related Chinese application No. 201280031258.7 along with English translation of same.

* cited by examiner

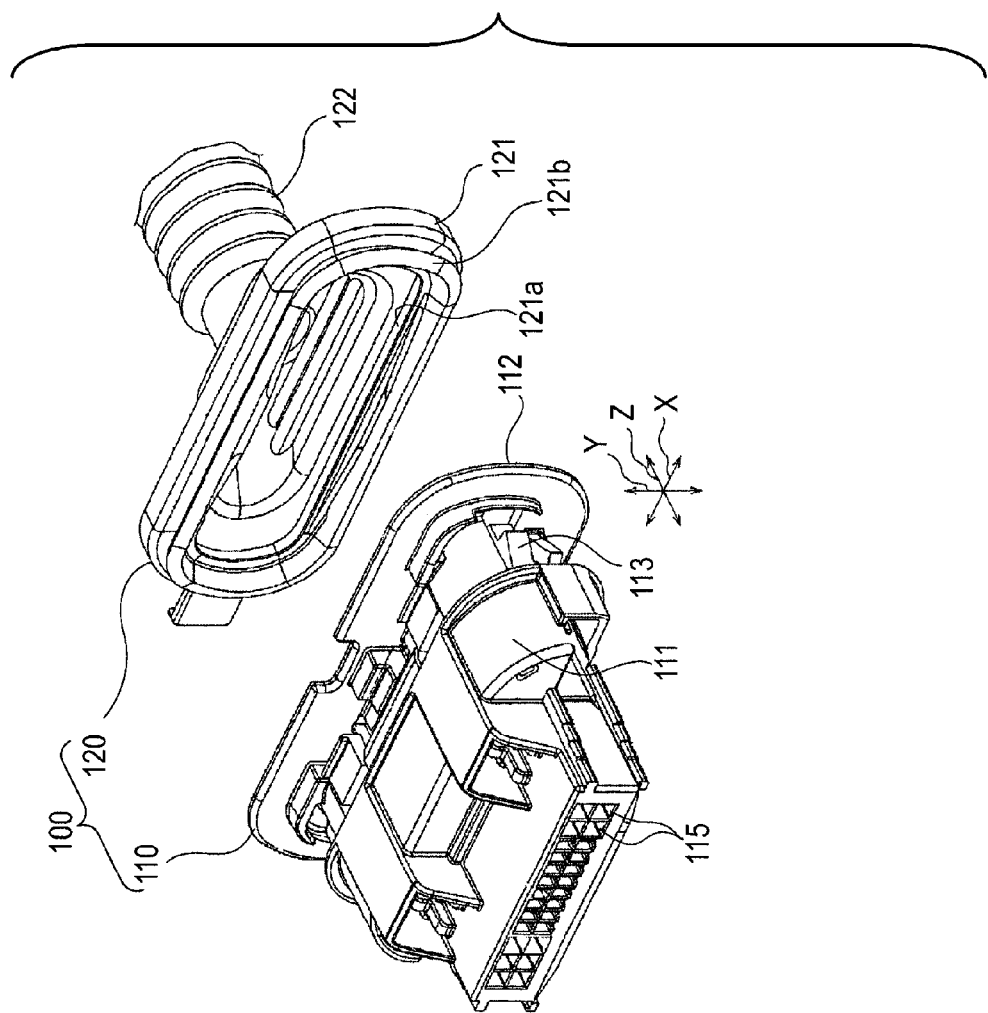
FIG.12
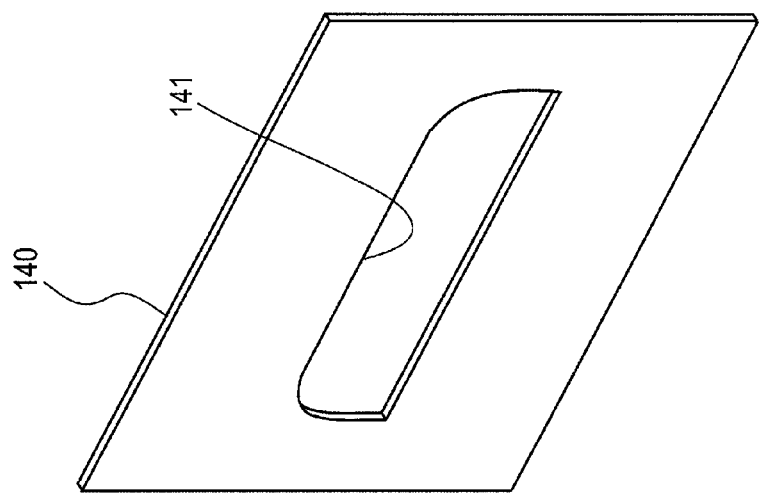

CONNECTOR WITH GROMMET

CROSS REFERENCE TO RELATED APPLICATIONS

This application is a continuation of PCT application No. PCT/JP2012/066632, which was filed on Jun. 22, 2012 based on Japanese Patent Application (No. 2011-140767) filed on Jun. 24, 2011, the contents of which are incorporated herein by reference.

BACKGROUND OF THE INVENTION

1. Field of the Invention

The present invention relates to a connector with grommet which includes a connector housing and a waterproof grommet attached to the connector housing whereby a fitting part of the connector housing and a panel is sealed by bringing the grommet into close contact with the peripheral edge of an attachment hole of the panel to which the connector housing is attached.

2. Description of the Related Art

FIGS. 12 to 14 show a connector with grommet disclosed in JP-A-2010-102872.

This connector 100 with grommet includes a connector housing 110 fittingly mounted in an attachment hole 141 of a panel 140 which is a cabinet, and a waterproof grommet 120 attached to this connector housing 110.

In FIG. 12, an arrow X indicates a width direction of the connector housing 110 and an arrow Y indicates a vertical direction of the connector housing 110 and an arrow Z indicates a direction of insertion of the connector housing 110 into the attachment hole 141.

The connector housing 110 includes a housing body 111 inserted into the attachment hole 141 of the panel 140, a flange 112 which is formed on the back end of the housing body 111 in a flanged overhanging state and can abut on the peripheral edge of the attachment hole 141, and a locking protrusion 113 projected and formed on the outer periphery of the housing body 111 so as to hold the panel 140 between the flange 112 and the locking protrusion 113.

The housing body 111 is equipped with a plurality of terminal receiving holes 115 in an aligned state. A terminal fitting connected to a circuit of the inside of the panel 140 is mounted in each of the terminal receiving holes 115.

Also as shown in FIG. 13, the locking protrusion 113 is a protrusion formed on the distal end of an elastic piece 114 capable of being elastically displaced inwardly (in a direction of arrow X1 in FIG. 13), and a gap S for holding the peripheral edge of the attachment hole 141 of the panel 140 is formed between the flange 112 and the locking protrusion 113. Also, when the housing body 111 is inserted into the attachment hole 141, the locking protrusion 113 retracts into the housing body 111 by flexure of the elastic piece 114 to enable insertion of the housing body 111 into the attachment hole 141.

The waterproof grommet 120 includes a flange attachment part 121 attached to the flange 112 so as to surround the outer periphery of the flange 112, and a tubular part 122 consecutively provided in the flange attachment part 121 so as to receive an electric wire extending from the back end of the housing body 111.

The inner periphery of the flange attachment part 121 is provided with a fitting groove 121a into which the outer periphery of the flange 112 is tightly fitted. The waterproof grommet 120 becomes coupled to the back end of the connector housing 110 by fitting the flange 112 into the fitting groove 121a.

Also, on a surface of the side of the panel 140 in the flange attachment part 121, a lip part 121b as a panel contact part for exerting waterproof properties by making contact with the panel 140 is annularly projected so as to go around the periphery of the attachment hole 141.

When the connector housing 110 in which the waterproof grommet 120 is mounted is inserted into the panel 140 and the locking protrusion 113 of the connector housing 110 is locked in the periphery of the back side of the attachment hole 141, the locking protrusion 113 and the flange 112 become attached so as to hold the peripheral edge of the attachment hole 141. At this time, the lip part 121b can make close contact with the peripheral edge of the attachment hole 141 of the panel 140 to obtain a state in which a fitting part of the connector housing 110 into the panel 140 is sealed with the waterproof grommet 120 as shown in FIG. 14.

SUMMARY OF THE INVENTION

In the connector 100 with grommet disclosed in JP-A-2010-102872 described above, the flange 112 has a simple flat plate shape, and the gap S formed by the flange 112 and the locking protrusion 113 is fixedly set.

As a result, when a plate thickness of the panel 140 is thinner than the standard, adhesion of the lip part 121b to the panel 140 decreases and waterproof properties may decrease.

Also, when the plate thickness of the panel 140 is thicker than the standard, deformation caused in the lip part 121b becomes excessive, so that a strong attachment operational force is required and attachment workability may become worse.

Hence, an object of the invention is to solve the problem described above, and is to provide a connector with grommet in which adhesion between a panel and a grommet and an operational force at the time of being attached to the panel do not become worse due to variations in plate thickness of the panel and good waterproof properties and attachment workability can be maintained regardless of the variations in plate thickness of the panel.

The above object of the invention is achieved by one of the following configurations.

(1) A connector with grommet, including:
a connector housing; and
a waterproof grommet attached to the connector housing,
the connector housing including a housing body to be inserted into an attachment hole of a panel, a flange which is formed on a back end of the housing body in a flanged overhanging state to abut on a peripheral edge of the attachment hole, and a locking protrusion projected and formed on an outer periphery of the housing body so as to hold the panel between the flange and the locking protrusion, and
the waterproof grommet including a flange attachment part attached to the flange so as to surround an outer periphery of the flange, and a tubular part consecutively provided in the flange attachment part so as to receive an electric wire extending from the back end of the housing body, wherein
a fitting part of the connector housing and the panel is sealed by bringing a panel contact part formed integrally to the flange attachment part into pressing contact with the peripheral edge of the attachment hole when the peripheral edge of the attachment hole is held between the locking protrusion and the flange,
the flange includes a plurality of flexible pieces which are distributed and arranged in a plurality of circumferential places of the flange and urge an inner surface of the flange attachment part to a side of the locking protrusion to elastically displace the panel contact part to the side of the locking protrusion so as to expand a proper plate thickness range of the panel capable of making close contact with the panel contact part.

(2) The connector with grommet according to the configuration (1), wherein at least one of the flexible pieces is a tongue-shaped region in which a part of the outer periphery of the flange is separated from the periphery by a pair of notches.

(3) The connector with grommet according to the configuration (2), wherein outer peripheries of the flange at both sides of the flexible piece are provided with loose preventive pieces for urging an inner surface of the flange attachment part to the side of the locking protrusion so as not to loosen the panel contact part in portions of the notches, and strength of the loose preventive piece is set lower than that of the flexible piece so as to displace or deform the loose preventive piece in a position in which the loose preventive piece does not project from the flexible piece to a side of the panel by stress acting on the panel contact part when the panel contact part makes close contact with the peripheral edge of the attachment hole.

According to the configuration (1), the panel contact part of the waterproof grommet attached to the flange is elastically displaced to the side of the locking protrusion of the outer periphery of the housing body by the plural flexible pieces, and a movable range of the panel contact part increases as compared with the case where the flange has a simple flat plate shape without having the flexible pieces described above.

As a result, the plate thickness range of the panel in which the panel contact part has a proper degree of adhesion is expanded and, for example, when a plate thickness of the panel is thinner than the standard, adhesion of the panel contact part to the panel can be inhibited from decreasing to prevent a decrease in waterproof properties. Also, for example, when the plate thickness of the panel is thicker than the standard, flexural displacement of the flexible pieces of the flange relaxes compression acting on the panel contact part and compressive deformation of the panel contact part is inhibited from becoming excessive, so that an attachment operational force does not increase greatly and worsening of attachment workability resulting from an increase in the attachment operational force can be prevented.

Therefore, adhesion between the panel and the grommet and the operational force at the time of being attached to the panel do not become worse due to variations in plate thickness of the panel, and good waterproof properties and attachment workability can be maintained regardless of the variations in plate thickness of the panel.

According to the configuration (2), in the plurality of flexible pieces formed in the flange, the notches have only to be put in the outer periphery of the flange and formation of the flexible pieces is facilitated and also the flange can become heavy by formation of the flexible pieces.

According to the configuration (3), the loose preventive pieces formed in the flange prevent the panel contact part from being loosened in the portions of the notches, so that loose wrinkles resulting in a decrease in waterproof properties can be prevented from occurring between the panel and the panel contact part to improve the waterproof properties.

Also, since strength of the loose preventive piece is lower than that of the flexible piece, deformation movement of the flexible piece corresponding to the plate thickness or the like of the panel is not blocked by rigidity of the loose preventive piece. Therefore, the degree of adhesion between the panel contact part and the panel can be maintained properly by displacement movement of the flexible piece, and stable waterproof properties can be ensured regardless of variations in plate thickness of the panel.

According to the connector with grommet in aspects of the invention, the panel contact part of the waterproof grommet attached to the flange is elastically displaced to the side of the locking protrusion of the outer periphery of the housing body by the plurality of flexible pieces, and a movable range of the panel contact part increases as compared with the case where the flange has a simple flat plate shape without having the flexible pieces described above.

As a result, adhesion between the panel and the grommet and the operational force at the time of being attached to the panel do not become worse due to variations in plate thickness of the panel, and good waterproof properties and attachment workability can be maintained regardless of the variations in plate thickness of the panel.

BRIEF DESCRIPTION OF THE DRAWINGS

FIG. 12 is an exploded perspective view of a connector with grommet in the related art.

DETAILED DESCRIPTION OF THE EXEMPLARY EMBODIMENTS

A connector with grommet according to an embodiment of the invention will hereinafter be described in detail with reference to the drawings.

Figure 1:
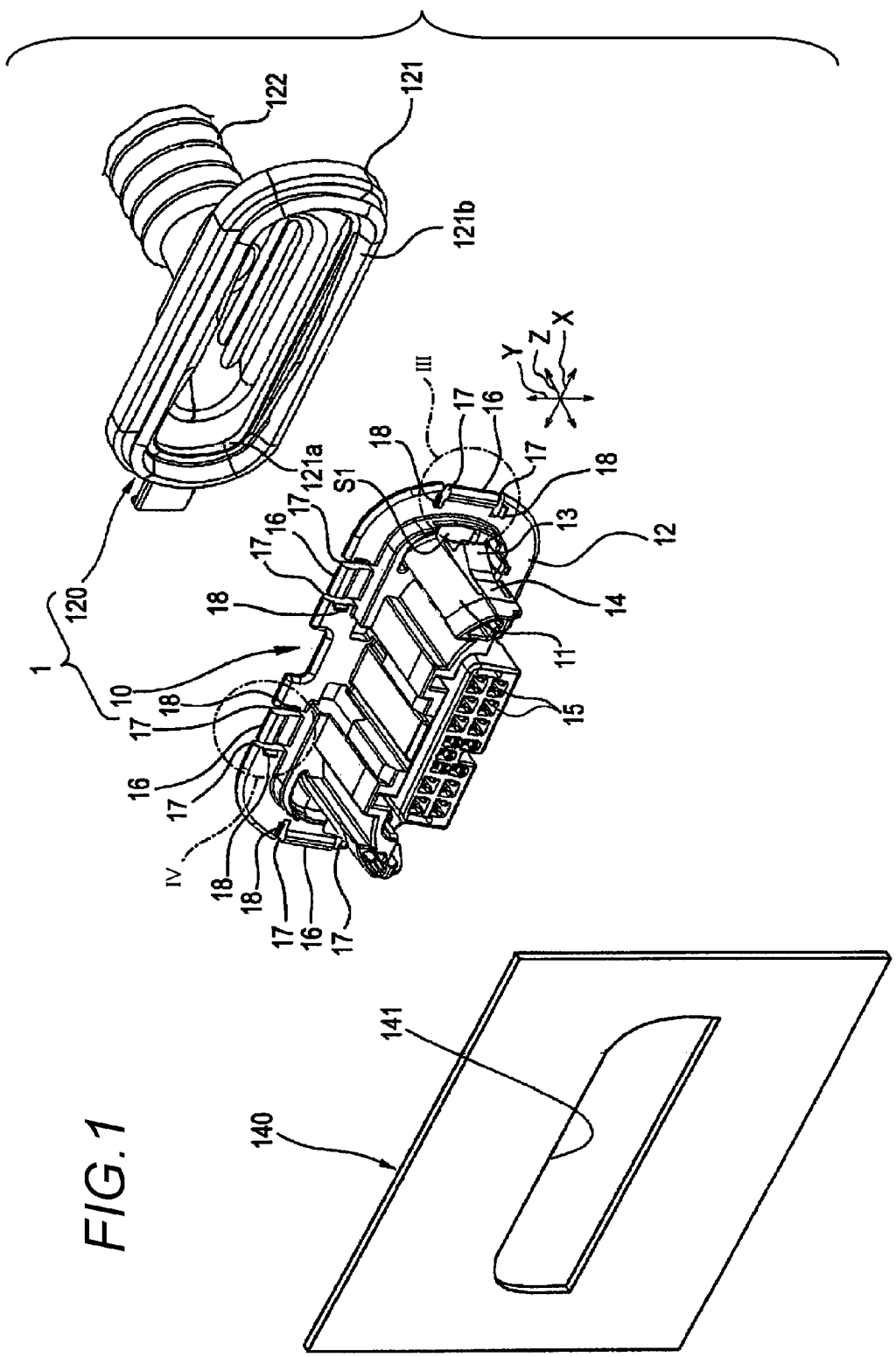
FIG. 1 is an exploded perspective view of a connector with grommet according to one embodiment of the invention.
Figure 2:
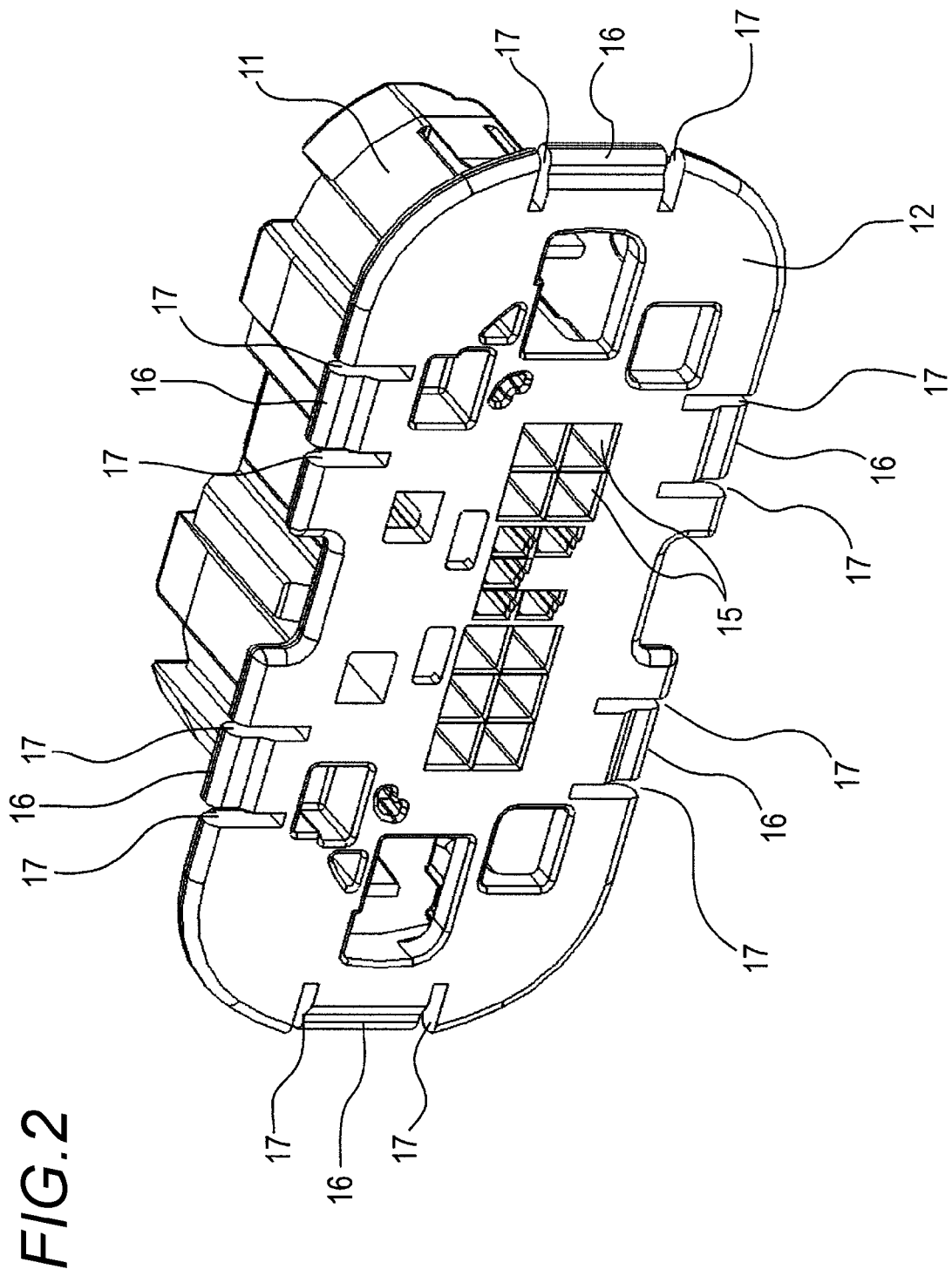
FIG. 2 is a perspective view from the front side of a connector housing shown in FIG. 1.
Figure 3:
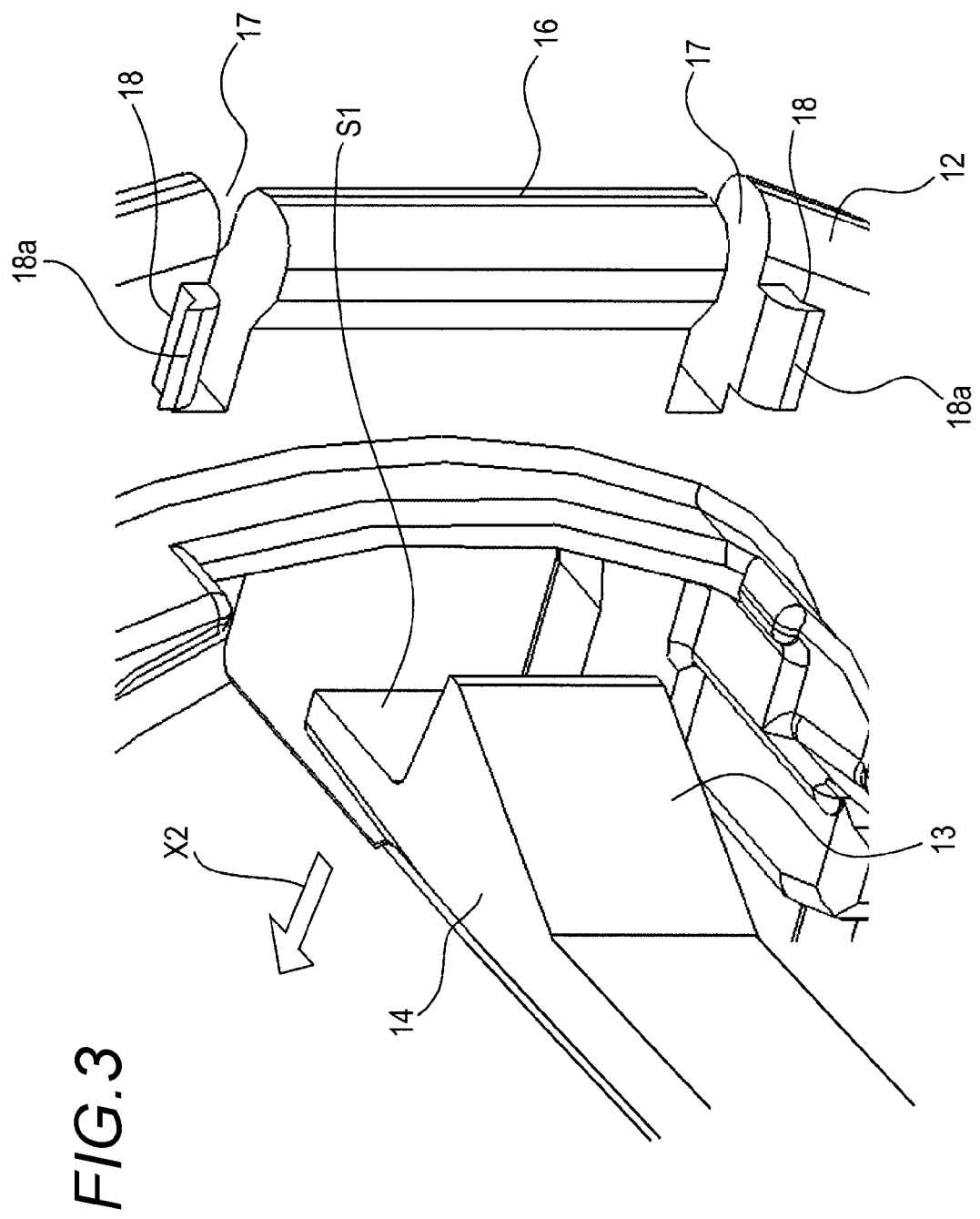
FIG. 3 is an enlarged view of part III of the connector housing in FIG. 1.
Figure 4:
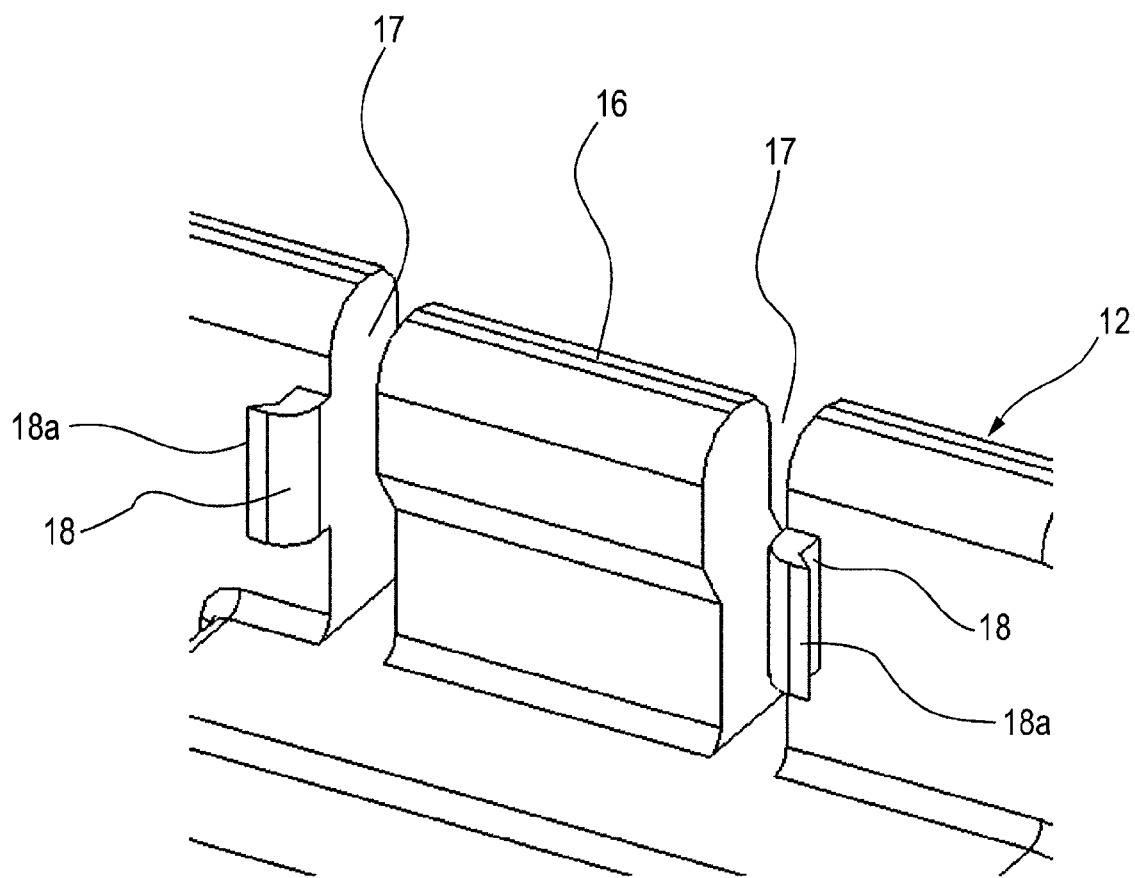
FIG. 4 is an enlarged view of part IV of the connector housing in FIG. 1.
Figure 5:
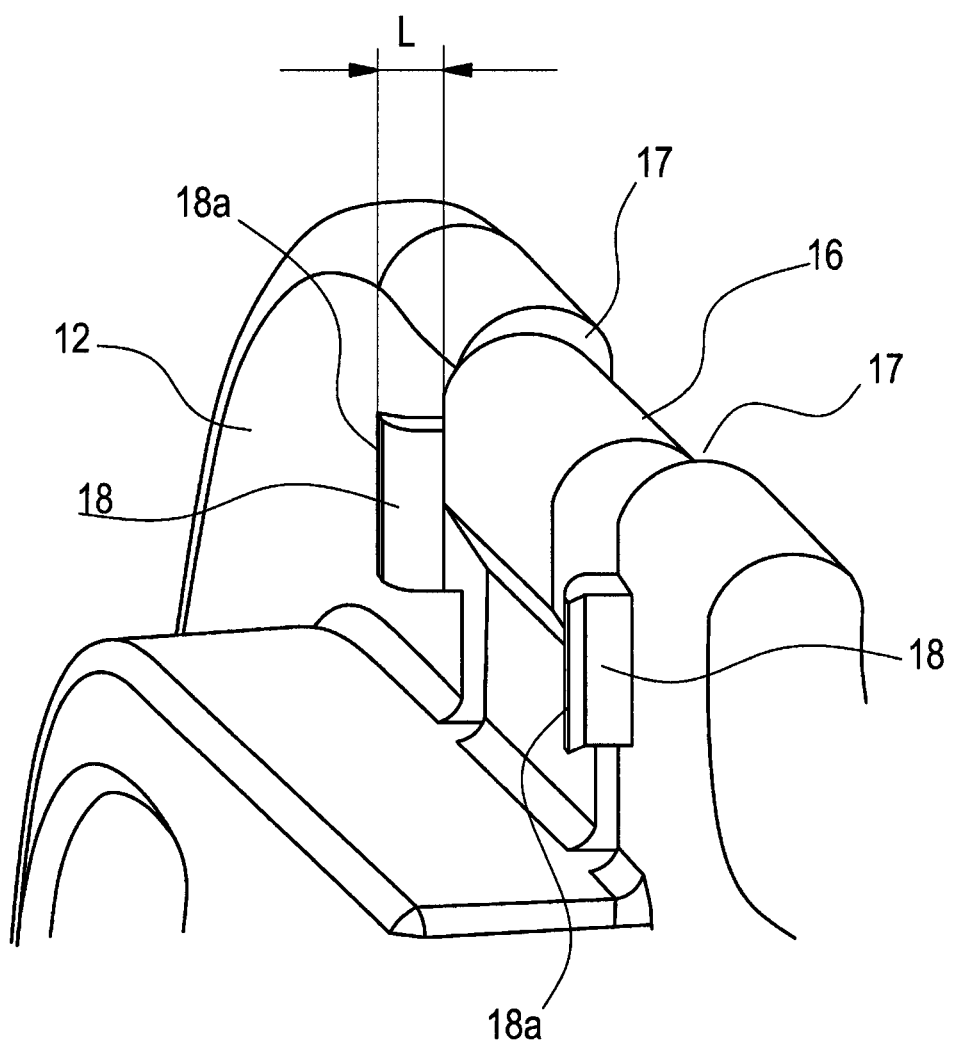
FIG. 5 is a perspective view showing a difference between a locking protrusion and a loose preventive piece in projection length in the connector housing according to one embodiment.
Figure 6:
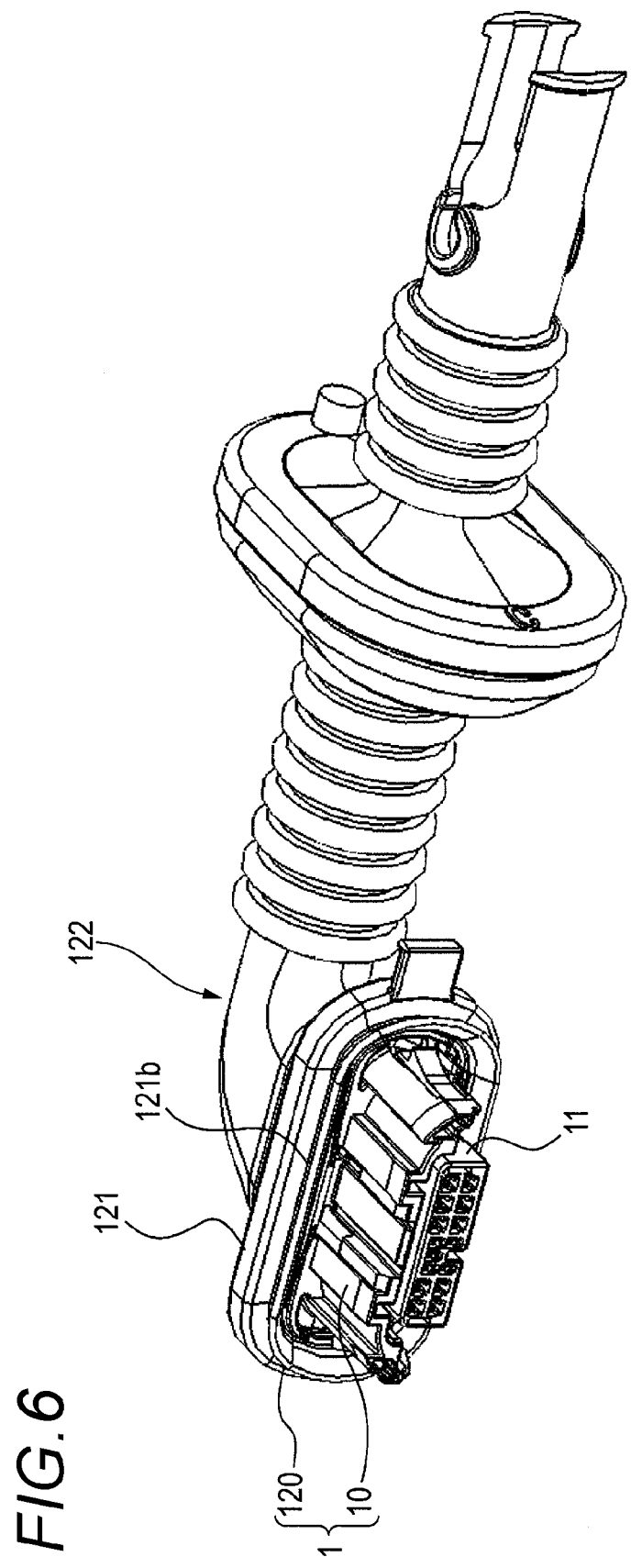
FIG. 6 is a perspective view of a state in which a waterproof grommet is mounted in the connector housing according to one embodiment.
Figure 7:
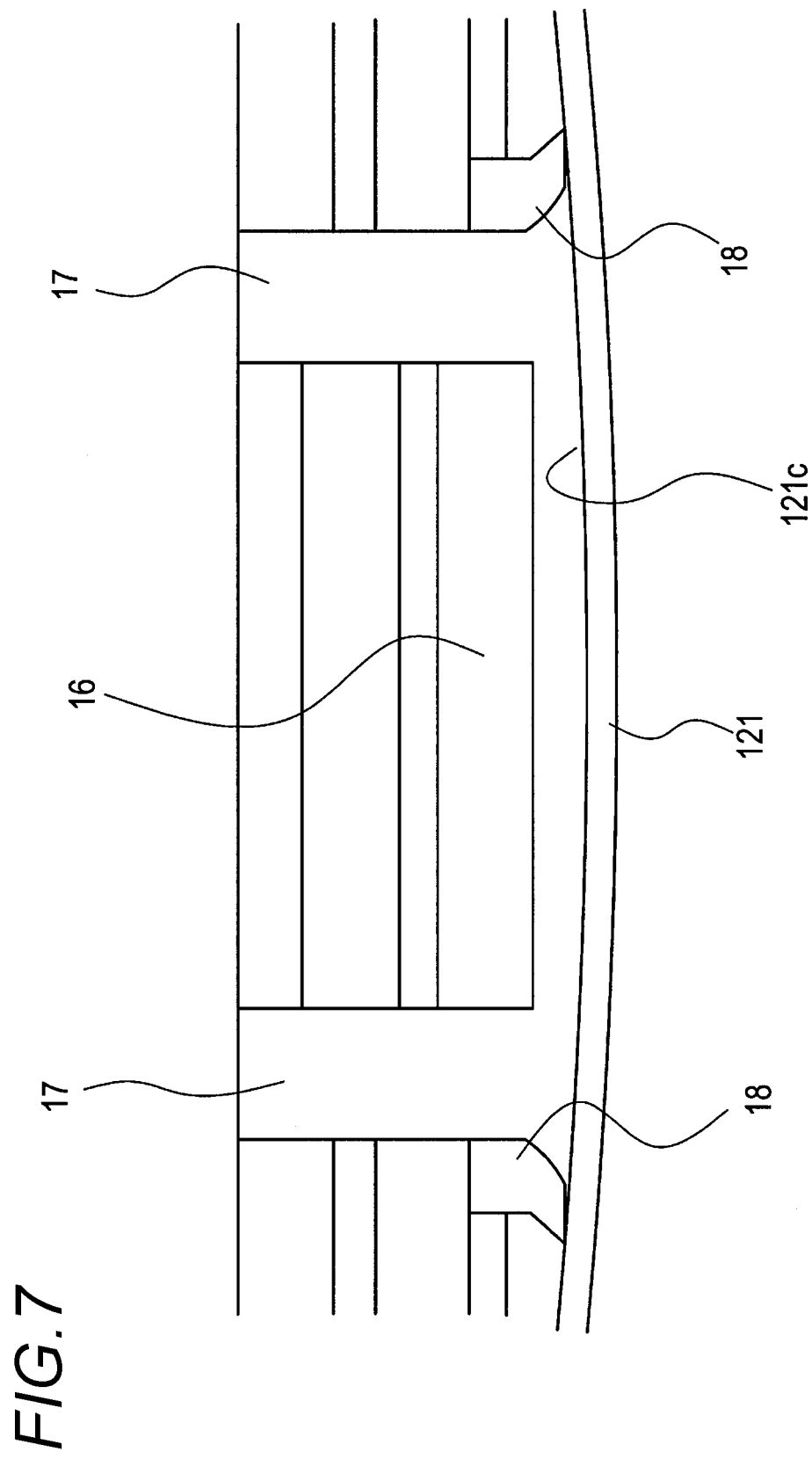
FIG. 7 is an explanatory diagram of a state in which a flange attachment part of the waterproof grommet attached to a flange part of the connector housing according to one embodiment is tensed by the loose preventive pieces.
Figure 8:
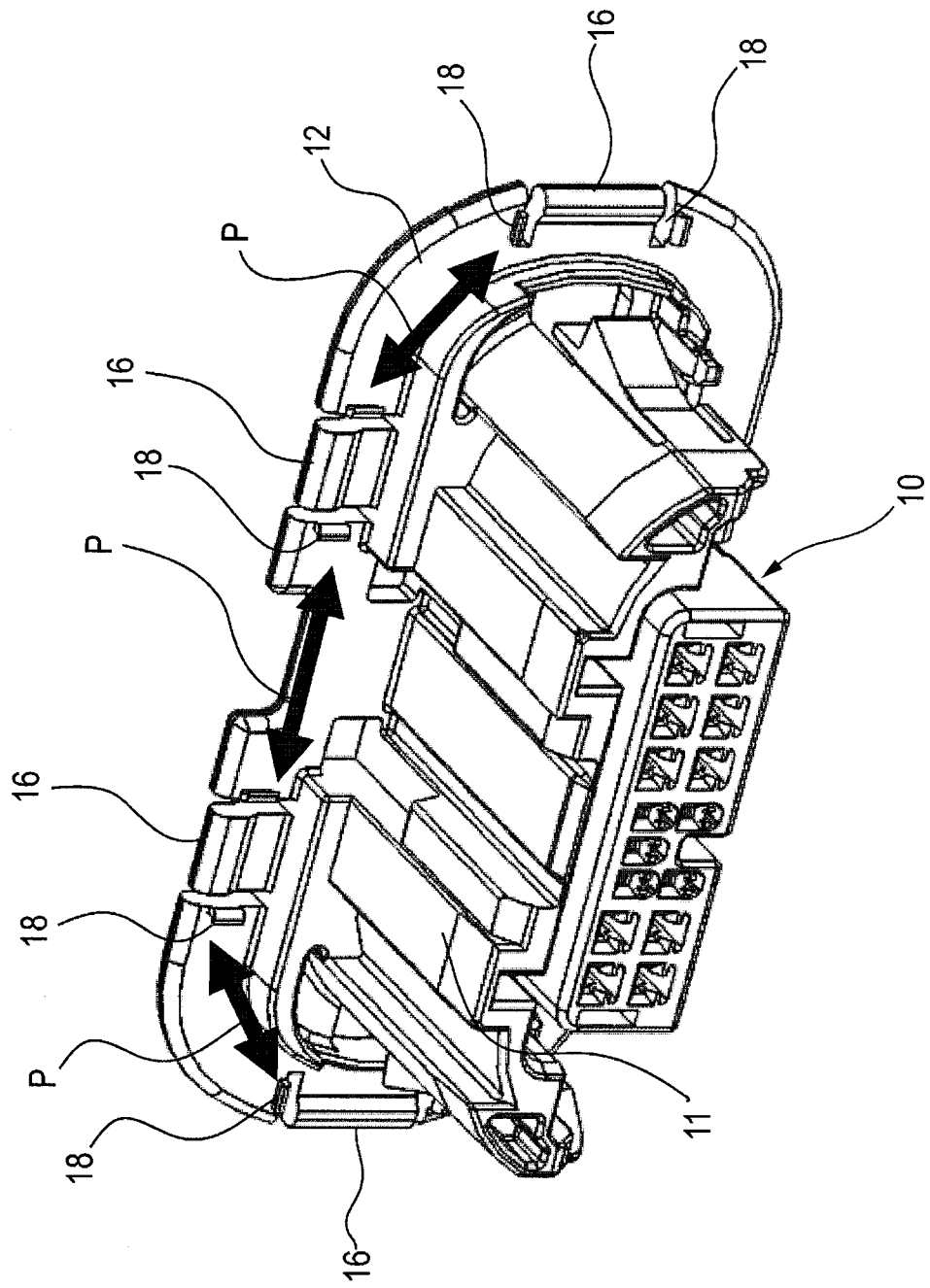
FIG. 8 is an explanatory diagram of tension acting on both sides of notches of the connector housing according to one embodiment.
Figure 9:
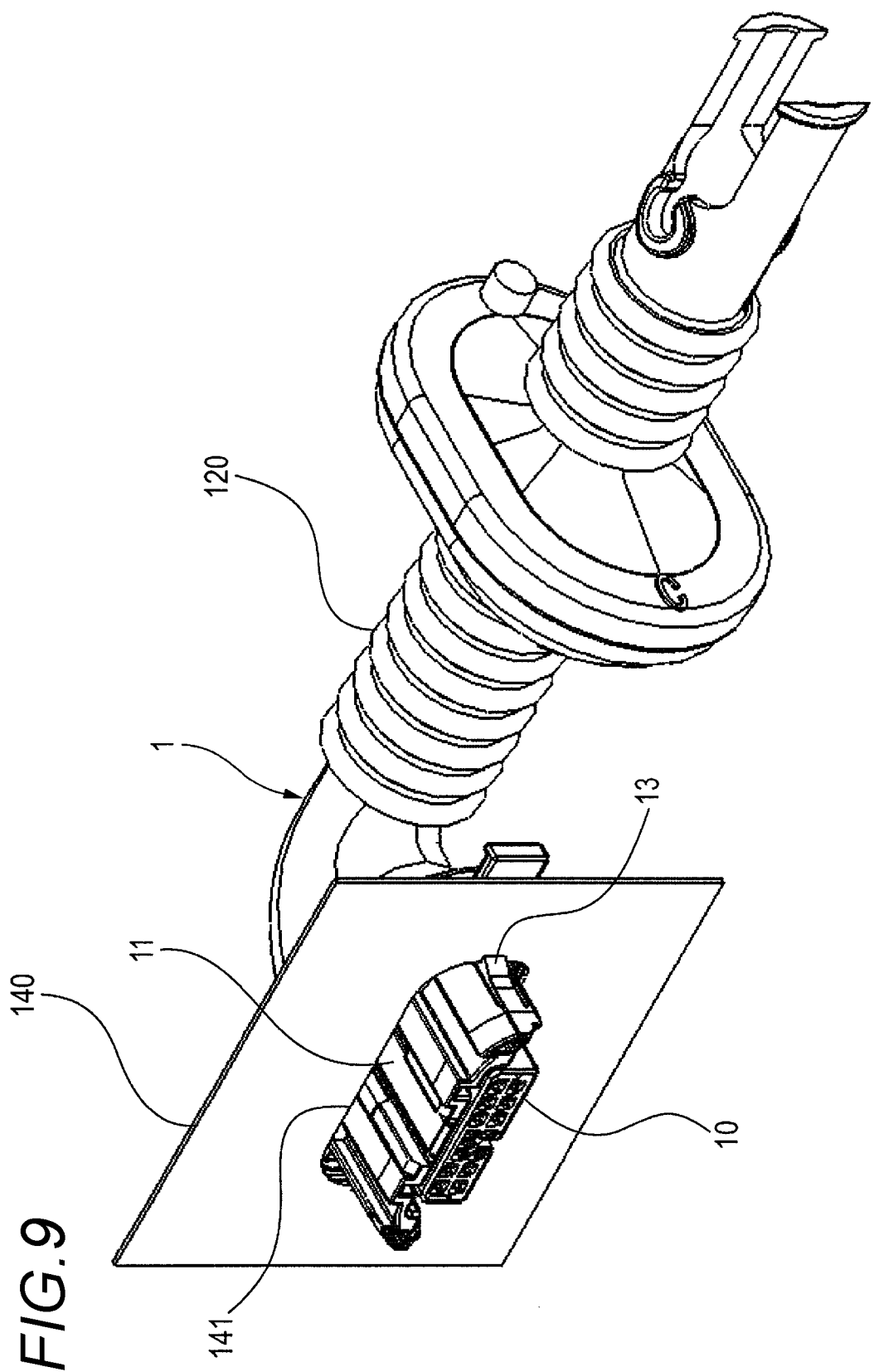
FIG. 9 is a perspective view of a state in which the connector with grommet according to one embodiment is attached to a panel.
Figure 10:
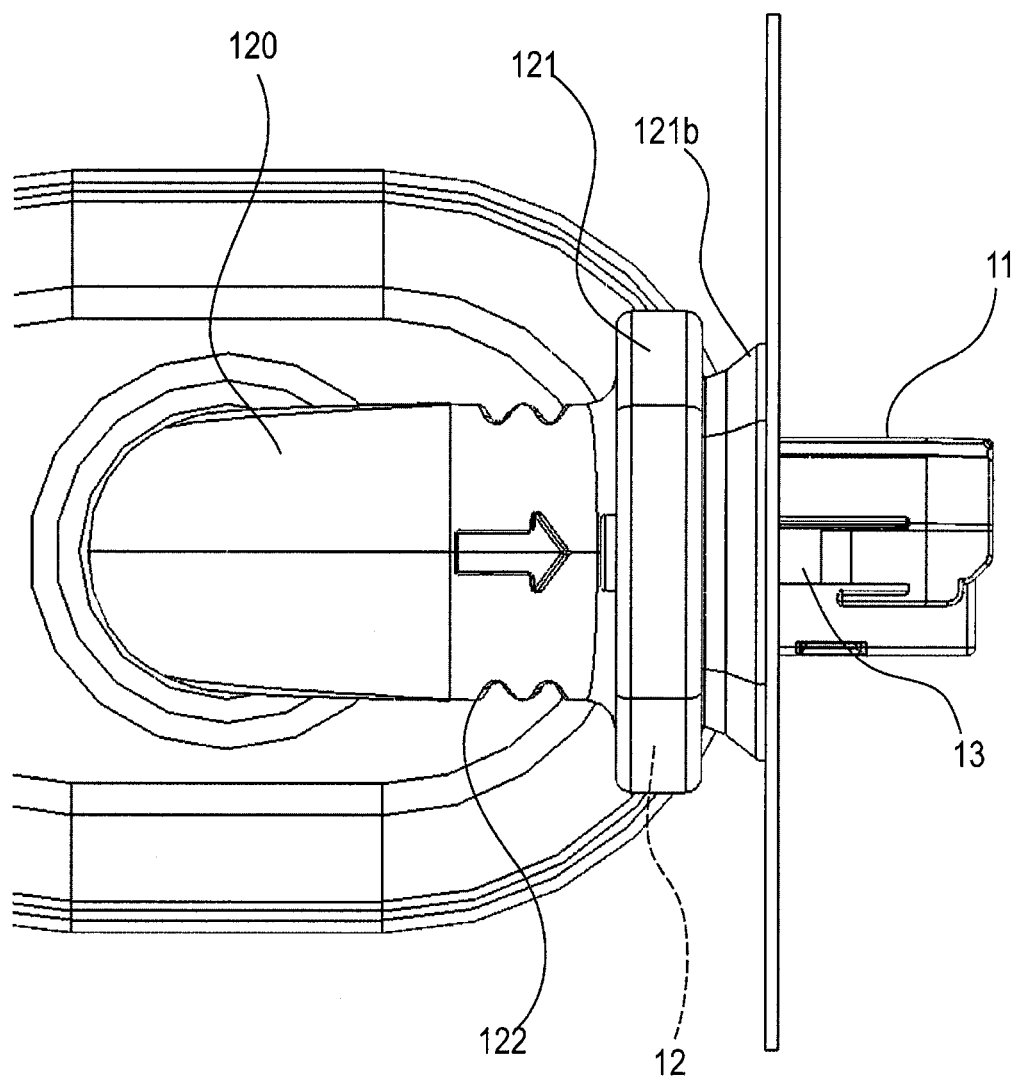
FIG. 10 is a side view of a state in which the connector with grommet according to one embodiment is attached to the panel.
Figure 11:
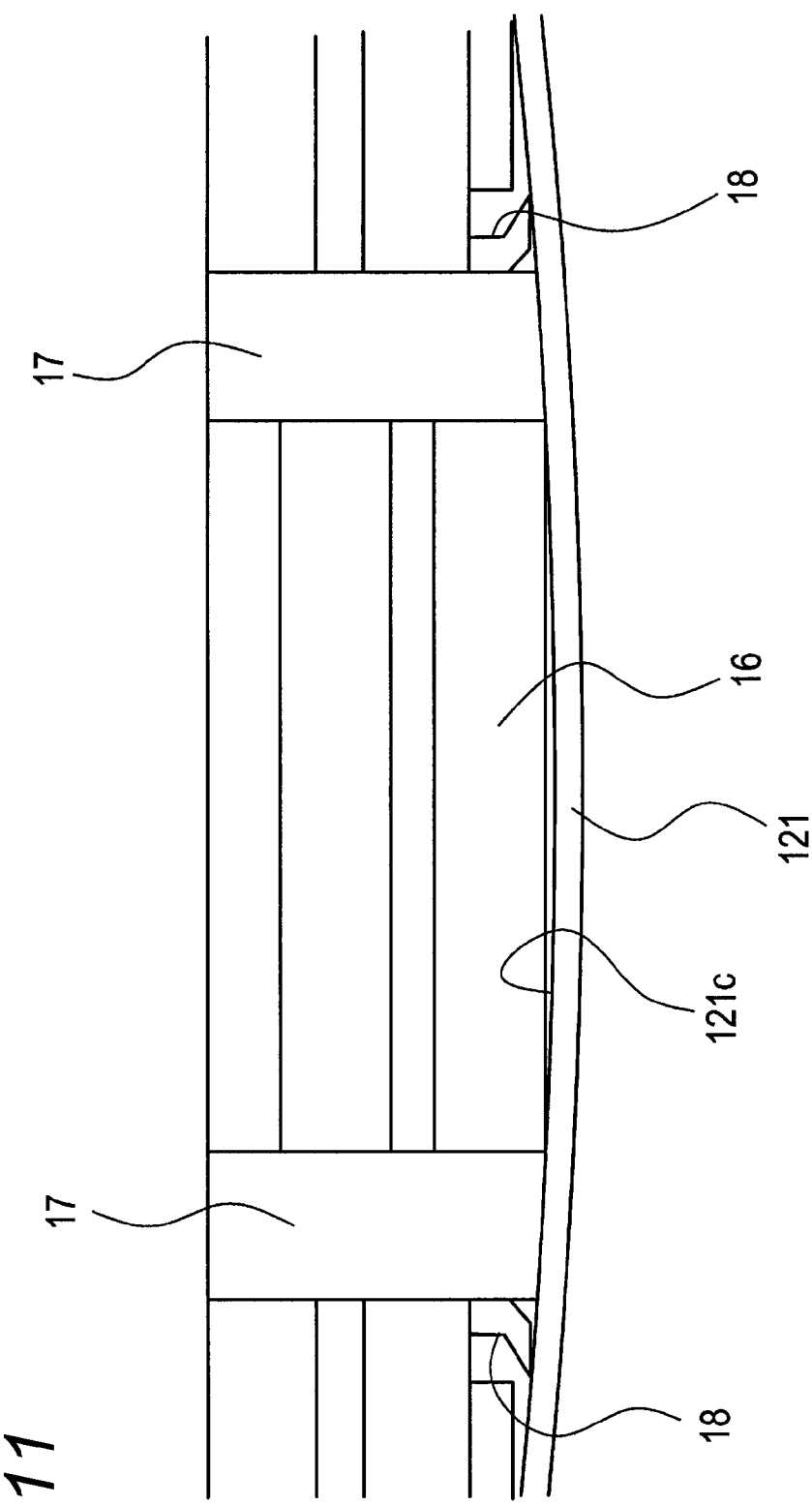
FIG. 11 is an explanatory diagram of the periphery of a flexible piece in the state in which the connector with grommet according to one embodiment is attached to the panel.
Figure 13:
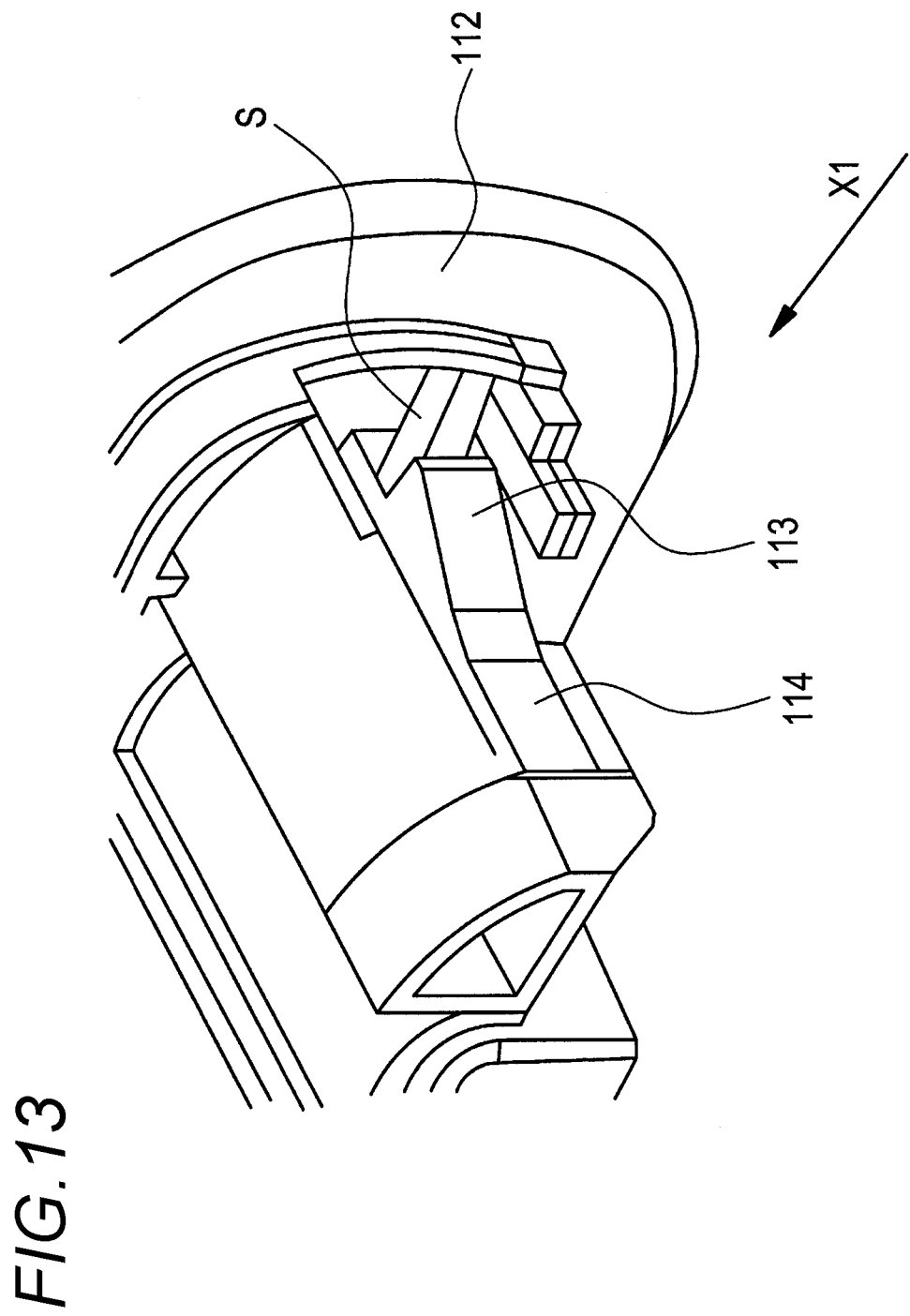
FIG. 13 is an enlarged view of the periphery of a locking protrusion of a connector housing shown in FIG. 12.
Figure 14:
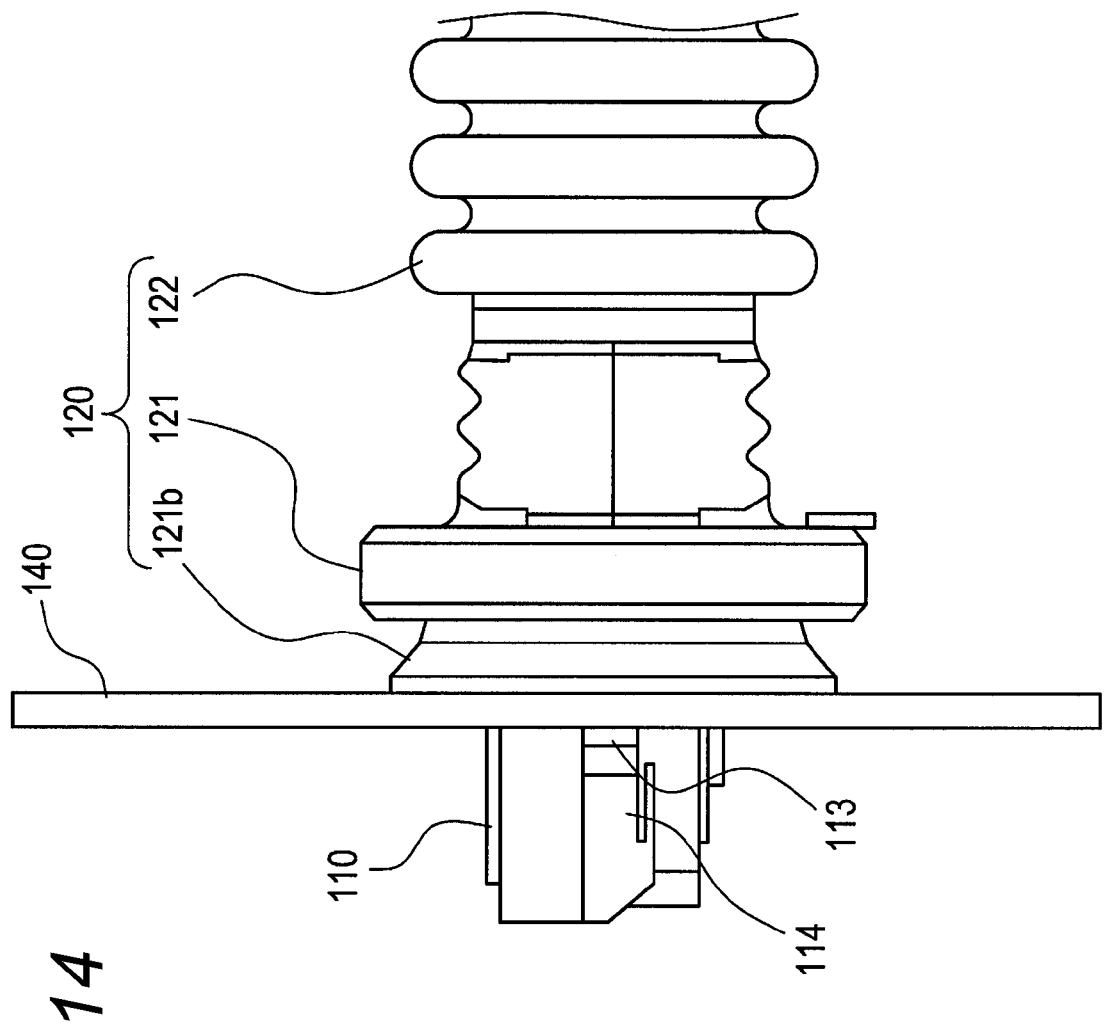
FIG. 14 is a side view of a state in which the connector with the grommet shown in FIG. 12 is attached to a panel.

FIGS. 1 to 11 show a connector with grommet according to one embodiment of the invention. FIG. 1 is an exploded perspective view a connector with grommet according to one embodiment of the invention. FIG. 2 is a perspective view from the front side of a connector housing shown in FIG. 1. FIG. 3 is an enlarged view of part III of the connector housing in FIG. 1. FIG. 4 is an enlarged view of part IV of the connector housing in FIG. 1. FIG. 5 is a perspective view showing a difference between a locking protrusion and a loose preventive piece in projection length in the connector housing according to one embodiment. FIG. 6 is a perspective view of a state in which a waterproof grommet is mounted in the connector housing according to one embodiment. FIG. 7 is an explanatory diagram of a state in which a flange attachment part of the waterproof grommet attached to a flange part of the connector housing according to one embodiment is tensed by the loose preventive pieces. FIG. 8 is an explanatory diagram of tension acting on both sides of notches of the connector housing according to one embodiment. FIG. 9 is a perspective view of a state in which the connector with grommet according to one embodiment is attached to a panel. FIG. 10 is a side view of a state in which the connector with grommet according to one embodiment is attached to the panel. FIG. 11 is an explanatory diagram of the periphery of a flexible piece in the state in which the connector with grommet according to one embodiment is attached to the panel.

A connector 1 with grommet according to the embodiment includes a connector housing 10 fittingly mounted in an attachment hole 141 of a panel 140 which is a cabinet, and a waterproof grommet 120 attached to the connector housing 10.

In FIG. 1, an arrow X indicates a width direction of the connector housing 10 and an arrow Y indicates a vertical direction of the connector housing 10 and an arrow Z indicates a direction of insertion of the connector housing 10 into the attachment hole 141.

The connector housing 10 includes a housing body 11 inserted into the attachment hole 141 of the panel 140, a flange 12 which is formed on the back end of the housing body 11 in a flanged overhanging state and can abut on the peripheral edge of the attachment hole 141, and a locking protrusion 13 projected and formed on the outer periphery of the housing body 11 so as to hold the panel 140 between the flange 12 and the locking protrusion 13.

The housing body 11 is equipped with a plurality of terminal receiving holes 15 in an aligned state. A terminal fitting connected to a circuit of the inside of the panel 140 is mounted in each of the terminal receiving holes 15.

In the flange 12 of the embodiment, flexible pieces 16 are distributed and arranged in plural circumferential places. The flexible piece 16 is a tongue-shaped region in which a part of the outer periphery of the flange 12 is separated from the periphery by a pair of notches (or slits) 17 as shown in FIGS. 3 and 4. The flexible piece 16 is formed so as to project from a surface of the original flange 12 to the side of the panel 140. Further, the outer peripheries of the flange 12 of both sides of the flexible piece 16 are provided with loose preventive pieces 18 as shown in FIGS. 3 to 5.

These flexible pieces 16 and loose preventive pieces 18 will be supplemented after explanation of the waterproof grommet 120.

Also as shown in FIG. 3, the locking protrusion 13 is a protrusion formed on the distal end of an elastic piece 14 capable of being elastically displaced inwardly (in a direction of arrow X2 in FIG. 3), and a gap S1 for holding the peripheral edge of the attachment hole 141 is formed between the flange 12 and the locking protrusion 13. Also, when the housing body 11 is inserted into the attachment hole 141, the locking protrusion 13 retracts into the housing body 11 by flexure of the elastic piece 14 to enable insertion of the housing body 11 into the attachment hole 141.

The waterproof grommet 120 has the same configuration as that shown in FIG. 12. That is, the waterproof grommet 120 includes a flange attachment part 121 attached to the flange 12 so as to surround the outer periphery of the flange 12, and a tubular part 122 consecutively provided in the flange attachment part 121 so as to receive an electric wire extending from the back end of the housing body 11 as shown in FIG. 1.

The inner periphery of the flange attachment part 121 is provided with a fitting groove 121a into which the outer periphery of the flange 12 is tightly fitted. The waterproof grommet 120 becomes coupled to the back end of the connector housing 10 by fitting the flange 12 into the fitting groove 121a.

Also, on a surface of the side of the panel 140 in the flange attachment part 121, a lip part 121b as a panel contact part for exerting waterproof properties by making contact with the panel 140 is annularly projected so as to go around the periphery of the attachment hole 141.

Next, the flexible piece 16 and the loose preventive piece 18 will be supplemented.

First, the flexible piece 16 will be described.

A plurality of flexible pieces 16 formed so as to project from the surface of the original flange 12 to the side of the panel 140 urge an inner surface of the flange attachment part 121 (an inner surface of the fitting groove 121a) to the side of the locking protrusion 13 when the flange attachment part 121 of the waterproof grommet 120 is fittingly mounted in the flange 12 as shown in FIGS. 7 and 9. This urge of the inner surface of the flange attachment part 121 by the flexible pieces 16 elastically displaces the lip part 121b to the side of the locking protrusion 13 so as to expand a proper plate thickness range of the panel 140 capable of making close contact with the lip part 121b.

Next, the loose preventive piece 18 will be described.

The loose preventive piece 18 of the embodiment is a protrusion for urging the inner surface of the flange attachment part 121 to the side of the locking protrusion 13 so as not to loosen the lip part 121b in the portion of the notch 17. The distal end 18a of each of the loose preventive pieces 18 is set in a hook shape curved in a direction away from the flexible piece 16 as shown in FIGS. 3 and 4. Also, each of the loose preventive pieces 18 is set so that the distal end 18a projects from the flexible piece 16 to the side of the locking protrusion 13 by a dimension L as shown in FIG. 5. As a result, an inside surface 121c of the side of the locking protrusion 13 in the fitting groove 121a hanging over the flexible pieces 16 or the loose preventive pieces 18 becomes floating from the flexible piece 16 in a state in which a pressing force from the panel 140 does not act on the lip part 121b as shown in FIG. 7.

As shown in FIG. 7, each of the loose preventive pieces 18 urges the inside surface 121c of the lip part 121b to the side of the locking protrusion 13 and thereby, circumferentially pulling tension acts as shown by arrows P in FIG. 8 and the flange attachment part 121 is prevented from being loosened in the portion of the notch 17.

Further, in the embodiment, strength of each of the loose preventive pieces 18 is set lower than that of the flexible piece 16. Concretely, mechanical strength of each of the loose preventive pieces 18 is set by selection of shape or dimension setting so as to displace or plastically deform or elastically deform each of the loose preventive pieces 18 in a position in which each of the loose preventive pieces 18 does not project from the flexible piece 16 to the side of the panel 140 by stress acting on the lip part 121b when the lip part 121b makes close contact with the peripheral edge of the attachment hole 141.

When the connector housing 10 in which the waterproof grommet 120 is mounted is inserted into the panel 140 and the locking protrusion 13 of the connector housing 10 is locked in the periphery of the back side of the attachment hole 141 as shown in FIG. 9, the locking protrusion 13 and the flange 12 become attached so as to hold the peripheral edge of the attachment hole 141 as shown in FIG. 10. At this time, the lip part 121b can make close contact with the peripheral edge of the attachment hole 141 of the panel 140 to obtain a state in which a fitting part of the connector housing 10 into the panel 140 is sealed with the waterproof grommet 120. Also, by a pressing force acting on the lip part 121b from the panel 140, the loose preventive pieces 18 are displaced or plastically deformed or elastically deformed and the flexible pieces 16 support the inside surface 121c of the lip part 121b as shown in FIG. 11.

In the connector 1 with grommet according to one embodiment described above, the lip part 121b of the waterproof grommet 120 attached to the flange 12 is elastically displaced to the side of the locking protrusion 13 of the outer periphery of the housing body 11 by the plural flexible pieces 16, and a movable range of the lip part 121b increases as compared with the case where the flange 12 has a simple flat plate shape without having the flexible pieces 16 described above.

As a result, the plate thickness range of the panel 140 in which the lip part 121b has a proper degree of adhesion is expanded and, for example, when a plate thickness of the panel 140 is thinner than the standard, adhesion of the lip part 121b to the panel 140 can be inhibited from decreasing to prevent a decrease in waterproof properties. Also, for example, when the plate thickness of the panel 140 is thicker than the standard, flexural displacement of the flexible pieces 16 of the flange 12 relaxes compression acting on the lip part 121b and compressive deformation of the lip part 121b is inhibited from becoming excessive, so that an attachment operational force does not increase greatly and worsening of attachment workability resulting from an increase in the attachment operational force can be prevented.

Therefore, adhesion between the panel 140 and the waterproof grommet 120 and the operational force at the time of being attached to the panel 140 do not become worse due to variations in plate thickness of the panel 140, and good waterproof properties and attachment workability can be maintained regardless of the variations in plate thickness of the panel 140.

Also, in the connector 1 with grommet according to one embodiment described above, in the plurality of flexible pieces 16 formed in the flange 12, the notches 17 have only to be put in the outer periphery of the flange 12 and formation of the flexible pieces 16 is facilitated and also the flange 12 can become heavy by formation of the flexible pieces 16.

Also, in the connector 1 with grommet according to one embodiment described above, the loose preventive pieces 18 formed in the flange 12 prevent the lip part 121b from being loosened in the portions of the notches 17, so that loose wrinkles resulting in a decrease in waterproof properties can be prevented from occurring between the panel 140 and the lip part 121b to improve the waterproof properties.

Also, since strength of the loose preventive piece 18 is lower than that of the flexible piece 16, deformation movement of the flexible piece 16 corresponding to the plate thickness and the like of the panel 140 is not blocked by rigidity of the loose preventive piece 18. Therefore, the degree of adhesion between the lip part 121b and the panel 140 can be maintained properly by displacement movement of the flexible piece 16, and stable waterproof properties can be ensured regardless of variations in plate thickness of the panel 140.

In addition, the connector 1 with grommet according to the invention is not limited to the embodiment described above, and proper modifications, improvements, etc. can be made.

As long as an object of the invention can be achieved, for example, concrete shapes, dimensions, arrangement places or the number of flexible pieces or loose preventive pieces are arbitrary and are not limited to each embodiment described above.

What is claimed is:

1. A connector with grommet, comprising:
    a connector housing;
    a waterproof grommet attached to the connector housing;
    the connector housing including a housing body to be inserted into an attachment hole of a panel, a flange which is formed on a back end of the housing body in a flanged overhanging state to abut on a peripheral edge of the attachment hole, and a locking protrusion projected and formed on an outer periphery of the housing body so as to hold the panel between the flange and the locking protrusion; and
    the waterproof grommet including a flange attachment part attached to the flange so as to surround an outer periphery of the flange, and a tubular part consecutively provided in the flange attachment part so as to receive an electric wire extending from the back end of the housing body, wherein
    a fitting part of the connector housing and the panel is sealed by bringing a panel contact part formed integrally to the flange attachment part into pressing contact with the peripheral edge of the attachment hole when the peripheral edge of the attachment hole is held between the locking protrusion and the flange,
    the flange includes a plurality of flexible pieces which are distributed and arranged in a plurality of circumferential places of the flange and urge an inner surface of the flange attachment part to a side of the locking protrusion to elastically displace the panel contact part to the side of the locking protrusion so as to expand a proper plate thickness range of the panel capable of making close contact with the panel contact part.

2. The connector with grommet according to claim 1, wherein
    at least one of the flexible pieces is a tongue-shaped region in which a part of the outer periphery of the flange is separated from the periphery by a pair of notches.

3. The connector with grommet according to claim 2, wherein
    outer peripheries of the flange at both sides of the flexible piece are provided with loose preventive pieces for urging an inner surface of the flange attachment part to the side of the locking protrusion so as not to loosen the panel contact part in portions of the notches, and
    strength of the loose preventive piece is set lower than that of the flexible piece so as to displace or deform the loose preventive piece in a position in which the loose preventive piece does not project from the flexible piece to a side of the panel by stress acting on the panel contact part when the panel contact part makes close contact with the peripheral edge of the attachment hole.

* * * * *